(12) United States Patent
Bartmann et al.

(10) Patent No.: US 12,378,904 B2
(45) Date of Patent: Aug. 5, 2025

(54) FLOTATION-BASED VALVE TO PREVENT OIL FROM EXITING A VEHICLE OIL SUMP (71) Applicant: Atieva, Inc., Newark, CA (US)

(72) Inventors: Lukas Bartmann, Union City, CA (US); Dimitri Bassis, Union City, CA (US); Markus Hose, San Ramon, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/490,150

(22) Filed: Oct. 19, 2023

(65) Prior Publication Data

US 2024/0133324 A1 Apr. 25, 2024
US 2024/0229691 A9 Jul. 11, 2024

Related U.S. Application Data (60) Provisional application No. 63/380,287, filed on Oct. 20, 2022.

(51) Int. Cl.
F01M 11/04 (2006.01)
F16K 31/20 (2006.01)

(52) U.S. Cl.
CPC ......... F01M 11/0408 (2013.01); F16K 31/20 (2013.01)

(58) Field of Classification Search
CPC ............. F01M 11/062; F01M 11/0408; F01M 11/0004; F01M 11/005; F01M 11/06;
(Continued)

(56) References Cited

U.S. PATENT DOCUMENTS 2,022,898 A * 12/1935 Niven ...................... F16N 9/04
184/6.2
3,016,914 A * 1/1962 Keithahn ............... F16K 15/033
137/454.2

(Continued)

FOREIGN PATENT DOCUMENTS

DE 2701939 A1 7/1978
DE 102007034488 A1 * 1/2009 ......... F01M 11/0004

(Continued)

OTHER PUBLICATIONS

International Search Report and Written Opinion for PCT Application No. PCT/US2023/077263, mailed on Feb. 23, 2024, 13 pages.

Primary Examiner — Anna M Momper
Assistant Examiner — Katelynne R Burrell
(74) Attorney, Agent, or Firm — Brake Hughes Bellermann LLP (57) ABSTRACT An oil pan is attached to a motor to form an oil sump. An oil sump can have one or more valves. Oil can buoy a rotatably mounted valve member into a closed position, and gravity can rotate the valve into an open position. A valve can have a stadium shape. Valves can be placed symmetrically or asymmetrically with regard to a forward-reverse travel direction axis or to a left-right lateral acceleration axis. A bulbous portion of a valve member can enclose an air cavity and can extend into a valve opening. A valve can be placed at an oil pickup, wherein oil can buoy the valve to an open position and otherwise the valve member can be rotated to a closed position.

13 Claims, 4 Drawing Sheets (58) Field of Classification Search
CPC .............. F01M 11/064; F01M 11/065; F01M 2011/0033; F01M 2011/0037; F01M 2011/0041; F01M 2011/0087; F16K 31/20; F16K 31/18; F16K 15/025; F16K 15/033
USPC .................................................. 184/6.2, 80
See application file for complete search history.

(56) References Cited

U.S. PATENT DOCUMENTS

| | | | |
|---|---|---|---|
| 3,590,955 | A | 7/1971 | Rau |
| 5,196,824 | A | 3/1993 | Helm |
| 2015/0285437 | A1 | 10/2015 | Anzawa |
| 2021/0033213 | A1* | 2/2021 | Hohnbaum ............ F16K 33/00 |

FOREIGN PATENT DOCUMENTS

| | | | | |
|---|---|---|---|---|
| EP | 0924396 | A1 | | 6/1999 |
| GB | 112190 | | * | 5/1968 |
| JP | S5482246 | U | | 6/1979 |
| JP | S584714 | U | | 1/1983 |
| JP | 2001152824 | A | | 6/2001 |
| WO | WO-2011000647 | A1 | * | 1/2011 ........... F16K 24/042 |

* cited by examiner

“FLOTATION-BASED VALVE TO PREVENT OIL FROM EXITING A VEHICLE OIL SUMP

CROSS-REFERENCE TO RELATED APPLICATION

This application claims benefit, under 35 U.S.C. § 119, of U.S. Provisional Patent Application No. 63/380,287, filed on Oct. 20, 2022, entitled "FLOTATION-BASED VALVE TO PREVENT OIL FROM EXITING A VEHICLE OIL SUMP", the disclosure of which is incorporated by reference herein in its entirety.

TECHNICAL FIELD

This document relates to a flotation-based valve to prevent oil from exiting a vehicle oil sump.

BACKGROUND

Various types of machinery rely on oil for one or more purposes. For example, electric motors, vehicle transmissions, and internal combustion engines can use oil for lubrication and/or thermal management. A wet sump is an oil reservoir that is integral with the apparatus; a dry sump is an external oil reservoir. At least one oil pump is coupled to the wet sump or the dry sump to provide oil to the machine. Dry sumps, by contrast, typically require use of two or more oil pumps. Using multiple oil pumps adds significant complexity, mass and cost to the system.

SUMMARY

In an aspect, a motor for a vehicle comprises: a motor housing; an oil sump mounted to the motor for oil to drain from the motor housing into the oil sump, a width of the oil sump being greater than a depth of the oil sump, the oil sump having an oil pickup for circulating the oil; and a valve member mounted at a pivot point inside the oil sump, the valve member enclosing an air cavity for buoyancy, wherein the valve member is configured to rotate about the pivot point due to being buoyed by the oil.

Implementations can include any or all of the following features. The motor further comprises a bracket providing the pivot point, the valve member mounted using the bracket. The motor further comprises a member on at least one of the bracket or the valve member, the member providing overtravel protection for the valve member. The motor further comprises a biasing member that applies a bias to a rotation of the valve member at the pivot point. The bias provides a damping of an opening motion of the valve member. The bias provides a preload toward a closing motion of the valve member. The oil sump is mounted to the motor for the oil to drain from the motor housing into the oil sump through an opening in the motor housing, and wherein the valve member is configured to rotate about the pivot point between a first position covering the opening, due to being buoyed by the oil, and a second position not covering the opening. The motor comprises openings between the motor housing and the oil sump, and valve members for the respective openings. The openings and valve members are distributed at least along a travel direction of the vehicle. The openings and valve members are distributed at least perpendicularly to a travel direction of the vehicle. The valve member is positioned behind the oil pickup in a forward travel direction of the vehicle. Each of the valve member and the opening has a stadium shape. The stadium shape is positioned along a travel direction of the vehicle. The valve member comprises a bulbous portion that at least in part encloses the air cavity, and wherein the bulbous portion is configured to extend into the opening when the valve member covers the opening. The valve member is mounted to the oil pickup. The motor comprises multiple openings for the oil pickup, and valve members mounted to respective ones of the multiple openings. The multiple openings and the valve members are arranged in a cruciform shape. The multiple openings and the valve members are arranged in a linear shape.

BRIEF DESCRIPTION OF DRAWINGS

Like reference symbols in the various drawings indicate like elements.

DETAILED DESCRIPTION

This document describes examples of systems and techniques that provide a passive one-way valve at least partially preventing oil from exiting an oil sump of a motor, thereby keeping the oil inside the oil sump for more efficient extraction into an oil circulation system, while allowing returning oil to enter the oil sump. These approaches can improve the performance of the motor by reducing or eliminating incidences where the oil pickup inside the oil sump extracts air instead of oil. One or more valves can be used in an oil sump. At least one valve can be positioned at a drain opening from the motor housing into the oil sump, or at an opening of the oil pickup. The valve can be flotation based, so that its buoyancy allows the oil inside the sump to actuate the valve to one of its operating positions (e.g., a closed position preventing oil egress, or an open position permitting oil egress.) The valve can, but need not, form a 100% effective seal against oil. In some implementations the valve(s) can substantially prevent oil from exiting the sump, or substantially prevent air from entering the oil pickup.

The present subject matter can provide one or more advantages. An oil sump provided with a valve according to the present disclosure can be made less deep (i.e., shallower) than what may otherwise have been required. As a result, the drive unit can be fit inside a relatively smaller package space. This increases design freedom and can provide more space for another aspect of an overall vehicle where the motor is installed (e.g., allowing for a larger passenger compartment or cargo space in a vehicle). A motor according to the present subject matter can improve a performance vehicle by providing oil circulation that withstands greater forces (e.g., during acceleration, deceleration, and/or cornering). A motor according to the present subject matter can be operated with a significantly reduced oil fill volume because of the lessened requirement to have a high oil height to ensure that an oil pickup is always submerged. The present subject matter can allow the motor to be lighter (i.e., have less mass), require less packaging, and/or to be less complex than a motor with a dry sump, among other advantages.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons.

Examples herein refer to a motor of a vehicle. As used herein, a motor is any machine or other apparatus that uses circulating oil for at least one purpose. Examples of motors include, but are not limited to, electric motors (e.g., a permanent-magnet motor, an induction motor, a synchronous motor, or a reluctance motor) or internal combustion engines (e.g., a piston engine, or a rotary engine).

Examples described herein refer to a top, bottom, front, side, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1:
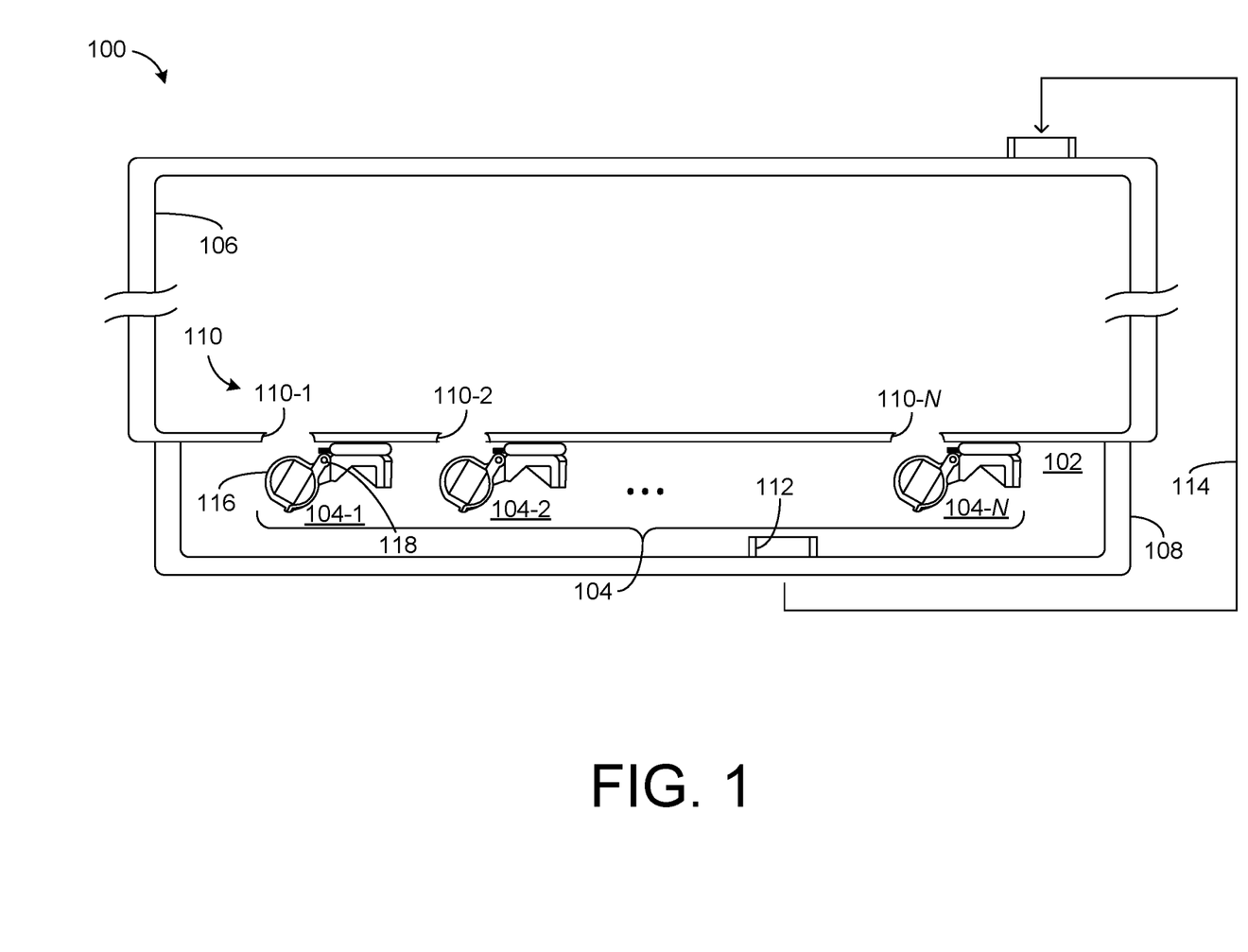
FIG. 1 shows an example of a vehicle motor having an oil sump with one or more valves according to the present subject matter.

FIG. 1 shows an example of a vehicle motor 100 having an oil sump 102 with one or more valves 104 according to the present subject matter. The vehicle motor 100 and/or the valves 104 can be used with one or more other examples described elsewhere herein. The vehicle motor 100 is here schematically shown in partial cross section and has a motor housing 106, which is shown truncated in the vertical direction of the illustration for simplicity. Aspects of the vehicle motor 100, some but not necessarily all of which may be located within the motor housing 106, are omitted for clarity. For example, the vehicle motor 100 can include a stator and a rotor, gears, power electronics, and a transmission.

An oil pan 108 is mounted to the motor housing 106 to form the oil sump 102 as a substantially enclosed space that can be at least partially filled with oil (not shown). The oil sump 102 is positioned below the motor housing 106 in the normal orientation of the vehicle motor 100 to allow gravity to cause oil in the motor housing 106 to flow toward and into the oil sump 102. The oil pan 108 can have any of multiple shapes. In some implementations, the oil pan 108 has a relatively shallow geometry compared to the rest of the vehicle motor 100. For example, the oil pan 108 can have an aspect ratio between width and height of about 1:8 or smaller, such as about 1:10 or smaller. In some implementations, other aspect ratios can be used, such as even higher ones. Here, the width of the oil pan 108 can indicate its greatest length in a direction left-right in the image; the depth of the oil pan 108 can indicate its greatest depth in a direction toward the motor housing 106. The shallow depth can allow the vehicle motor 100 to be effectively packaged inside a vehicle while providing additional space for other vehicle components.

The vehicle motor 100 has one or more openings 110 between the interior of the motor housing 106 and the oil sump 102. The opening(s) 110 can be formed using any suitable technique, including, but not limited to, by casting and/or by machining. That is, the opening(s) 110 can be formed in a wall (e.g., a bottom wall) of the motor housing 106, wherein the oil pan 108 is mounted to the outside of the motor housing 106 to cover such opening(s) 110. In some implementations, N number of openings 110-1, 110-2, ..., 110-N are used, where N=1, 2, .... The vehicle motor 100 has a corresponding one of the valves 104 for each of the openings 110, thus N number of valves 104-1, 104-2, ..., 104-N can be used, where N=1, 2, ....

The vehicle motor 100 has at least one oil pickup 112 inside the oil sump 102. The oil pickup 112 is an inlet of a pump that circulates the oil through the vehicle motor 100, as schematically illustrated by an arrow 114. That is, oil can be picked up at the oil pickup 112, be pressurized, travel to one or more areas of the vehicle motor 100 (e.g., within the motor housing 106 to perform lubrication and/or cooling), and drain back from the interior of the motor housing 106 into the oil sump 102 through the opening(s) 110.

Each of the valves 104 can include a valve member 116 that can be rotated about a pivot point 118. The valve member 116 can be a floating member (e.g., including an air cavity) such that oil in the oil sump 102 can buoy the valve member 116 into a closed position (covering the opening 110) when the oil is present near the valve 104, and so that gravity can rotate the valve member 116 about the pivot point 118 into an open position (not covering the opening 110) when the oil is not present near the valve 104. For example, in the closed position there can be line contact between at least part of the valve member 116 and at least part of the opening 110.

As such, the present example shows the vehicle motor 100 including the motor housing 106, and the oil sump 102 which is mounted to the vehicle motor 100 for oil to drain from the motor housing 106 into the oil sump 102, wherein a width of the oil sump 102 is greater than a depth of the oil sump 102, and wherein the oil sump 102 has the oil pickup 112 for circulating the oil. The vehicle motor 100 also includes the valve member 116 mounted to the pivot point 118 inside the oil sump 102, wherein the valve member encloses an air cavity for buoyancy. The valve member 116 is configured to rotate about the pivot point 118 due to being buoyed by the oil.

Figure 2:
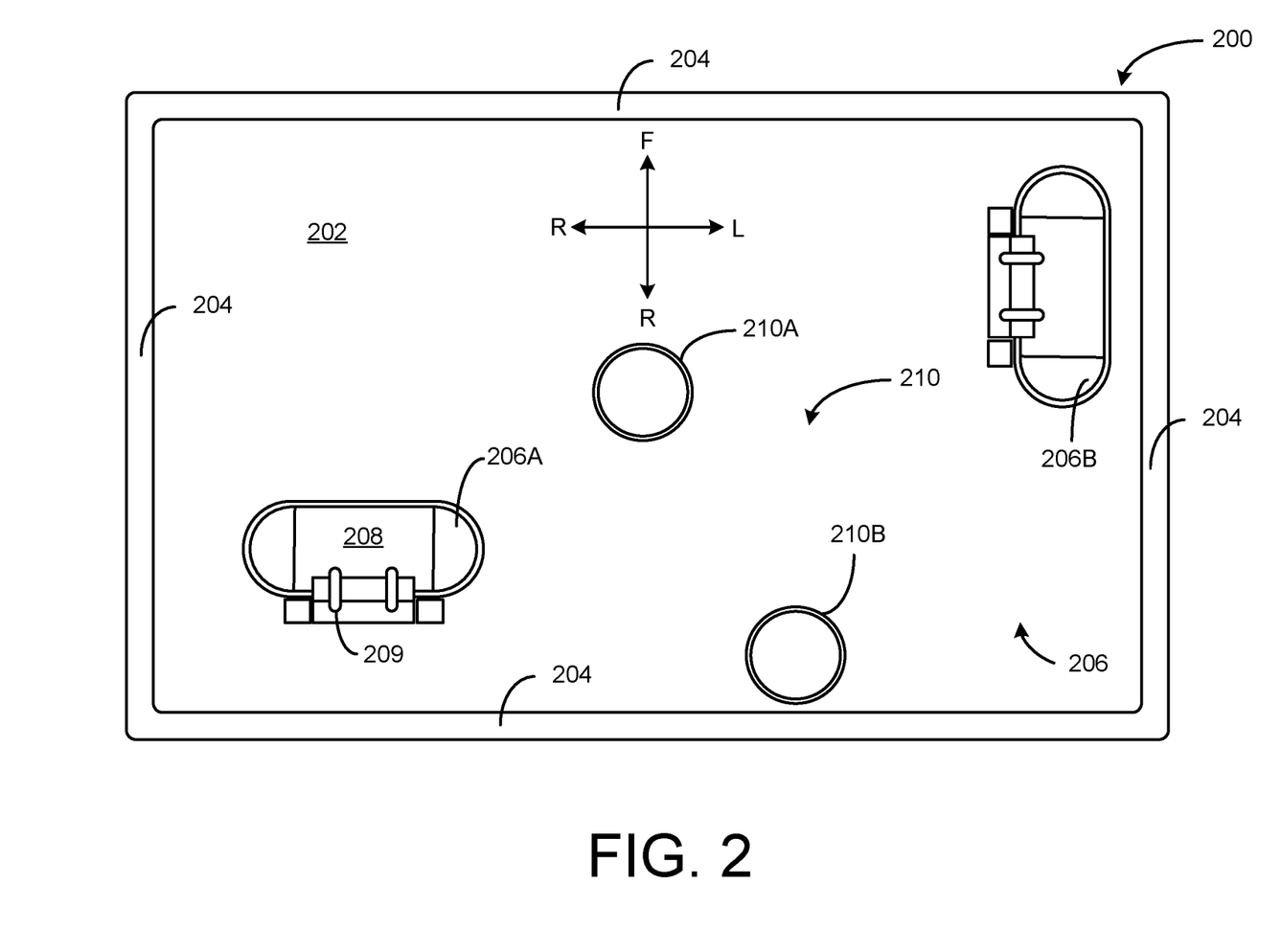
FIG. 2 shows an example of a bottom view of a motor.

FIG. 2 shows an example of a bottom view of a motor 200. The motor 200 can be used with one or more other examples described elsewhere herein. In this bottom view, a wall 202 (e.g., a bottom wall) of a motor housing is visible. A mating surface 204 is formed at the motor housing. For example, the mating surface 204 can form a closed shape (including, but not limited to, substantially a rectangular shape). In some implementations, an oil pan (e.g., the oil pan 108 in FIG. 1) can be attached to the motor housing along the mating surface 204 to form an oil sump. For example, the oil pan and optionally a seal at the mating surface 204 are omitted here for clarity to show the inside of the oil sump.

The motor 200 includes one or more valves 206. Each of the valves 206 can include a valve member 208 that is hinged about a pivot point by at least one hinge 209. The valve member 208 can be a floating member (e.g., including an air cavity) such that oil in the oil sump can buoy the valve member 208 into a closed position when the oil is present near the valve 206, and so that gravity can rotate the valve member 208 about the pivot point into an open position when the oil is not present near the valve 206.

The valve(s) 206 can be placed in any of multiple different positions within the oil sump. Here, forward (F) and reverse (R) travel directions of the vehicle are schematically illustrated by an F-R axis, and left (L) and right (R) lateral acceleration directions of the vehicle are schematically illustrated by an L-R axis. The valve(s) 206 can be placed symmetrically, or asymmetrically, in any direction with regard to either or both of the F-R axis or the L-R axis. In some implementations, the valve(s) can be distributed at least perpendicularly to a travel direction of the vehicle. For example, a valve 206A is here aligned with the L-R axis. In some implementations, the valve(s) can be distributed at least along a travel direction of the vehicle. For example, a valve 206B is here aligned with the F-R axis.

The motor 200 can include one or more oil pickups 210. For example, the oil pickup 210 can be an opening where a pump extracts oil from the oil sump. The oil pickup(s) 210 can be placed in any of multiple different positions within the oil sump. In some implementations, the valve 206A is positioned behind an oil pickup 210A in a forward travel direction of the vehicle. As another example, an oil pickup 210B can be positioned adjacent (e.g., abutting) the mating surface 204 (e.g., toward a rear of the oil sump).

The valve member(s) 208 can have any of multiple different shapes. In some implementations, the valve member(s) 208 can have substantially a stadium shape. For example, the stadium shape of the valve member 208 of the valve 206B is positioned substantially along a travel direction of the vehicle.

Figure 3:
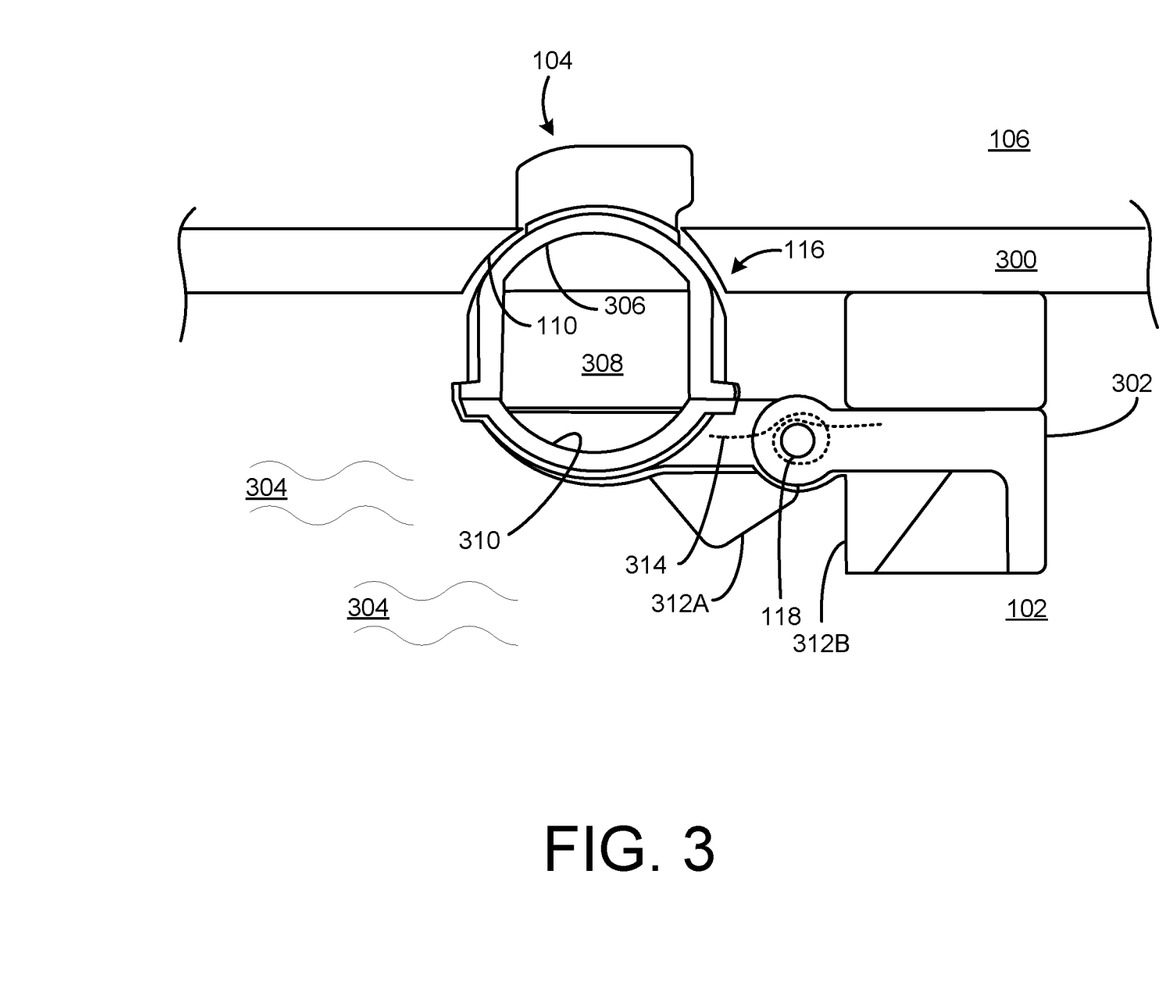
FIG. 3 shows an example of one of the valves of FIG. 1 in a closed position.

FIG. 3 shows an example of one of the valves 104 of FIG. 1 in a closed position. In this cross section, a wall 300 of the motor housing is partially shown, in which one of the openings 110 is formed. The valve member 116 is here rotatably mounted to a bracket 302 through the pivot point 118. For example, the bracket 302 can provide the pivot point 118. As such, oil 304 in the oil sump 102 can buoy the valve member 116 into a closed position (covering the opening 110) when the oil 304 is present near the valve 104, and gravity can rotate the valve member 116 about the pivot point 118 into an open position (not covering the opening 110) when the oil 304 is not present near the valve 104.

The valve member 116 can be formed from multiple parts. In some implementations, the valve member 116 includes a bulbous portion 306 that at least in part encloses an air cavity 308. The bulbous portion 306 can be configured to extend into the opening 110 when the valve member 116 covers the opening 110. The valve member 116 can include a portion 310 that mates with the bulbous portion 306 to define the air cavity 308. The air cavity 308 can provide buoyancy for the valve 104.

The valve 104 can protect against overtravel by the valve member 116. In some implementations, at least one member can be positioned on the valve member 116 and/or on the bracket 302 to provide overtravel protection for (e.g., by limiting rotation of) the valve member 116 is at least one direction. Here, a surface 312A on the valve member 116 and a surface 312B on the bracket 302 can be configured to abut each other at one end of the rotation of the valve member 116. The mass and/or size of the valve member 116 can be tuned for improved operation (e.g., in view of expected amounts of road vibration in the vehicle). For example, the valve member 116 can be configured to avoid a resonance frequency.

The valve member 116 can be biased in at least one direction. In some implementations, a biasing member 314 can apply a bias to a rotation of the valve member 116 at the pivot point 118. The biasing member 314 can include a spring, to name just one example, as here schematically shown in phantom. The biasing member 314 can provide a damping of an opening motion of the valve member 116 (e.g., the bias can resist contact between the surfaces 312A-312B). The biasing member 314 can provide a preload toward a closing motion of the valve member 116 (e.g., the bias can tend to urge the valve member 116 toward covering the opening 110).

Figure 4:
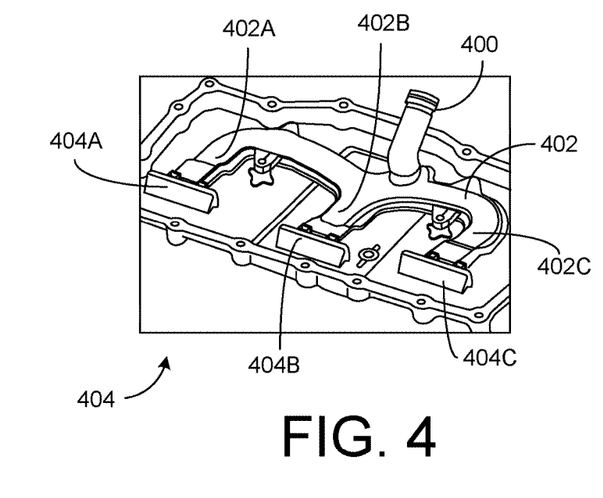
FIG. 4 shows an example of placing one or more valves at an oil pickup.

FIG. 4 shows an example of placing one or more valves at an oil pickup 400. The oil pickup 400 can be used with one or more other examples described elsewhere herein. The oil pickup 400 is coupled to a manifold 402 having respective arms 402A, 402B, and 402C. Respective openings for the oil pickup 400 are formed at the end of each of the arms 402A-402C. As such, the oil pickup 400 can in principle extract oil through any or all of the openings of the arms 402A-402C. One or more valves 404 is mounted to the oil pickup 400; particularly, the valves 404 can be positioned at each of the openings of the arms 402A-402C. Here, a valve 404A can either cover or not cover the opening of the arm 402A; a valve 404B can either cover or not cover the opening of the arm 402B; and a valve 404C can either cover or not cover the opening of the arm 402C. Each of the valves 404 has a valve member with buoyancy that can be buoyed by oil in the sump where the oil pickup 400 is used. When the oil is present near any of the valves 404, that valve member can be buoyed to an open position, thus allowing the oil pickup 400 to extract oil through the opening at the end of that arm of the manifold 402. In contrast, when the oil is not present near any of the valves 404, that valve member can be rotated (e.g., by gravity) to a closed position, thus preventing the oil pickup 400 from extracting oil through the opening at the end of that arm of the manifold 402. Here, the openings and the valves 404 are arranged substantially in a linear shape.

Figure 5:
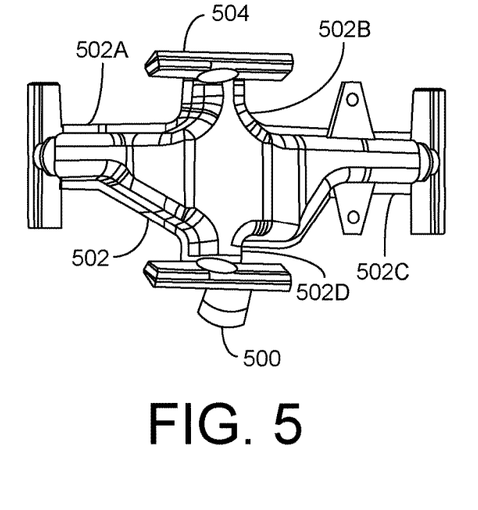
FIG. 5 shows another example of placing one or more valves at an oil pickup.

FIG. 5 shows another example of placing one or more valves at an oil pickup 500. The oil pickup 500 can be used with one or more other examples described elsewhere herein. The oil pickup 500 is coupled to a manifold 502 having respective arms 502A, 502B, 502C, and 502D. Respective openings for the oil pickup 500 are formed at the end of each of the arms 502A-502D. As such, the oil pickup 500 can in principle extract oil through any or all of the openings of the arms 502A-502D. One or more valves 504 is mounted to the oil pickup 500; particularly, the valves 504 can be positioned at each of the openings of the arms 502A-502D to either cover or not cover that opening of the arm. Each of the valves 504 has a valve member with buoyancy that can be buoyed by oil in the sump where the oil pickup 500 is used. When the oil is present near any of the valves 504, that valve member can be buoyed to an open position, thus allowing the oil pickup 500 to extract oil through the opening at the end of that arm of the manifold 502. In contrast, when the oil is not present near any of the valves 504, that valve member can be rotated (e.g., by gravity) to a closed position, thus preventing the oil pickup 500 from extracting oil through the opening at the end of that arm of the manifold 502. Here, the openings and the valves 404 are arranged in a cruciform shape.

Figure 6A:
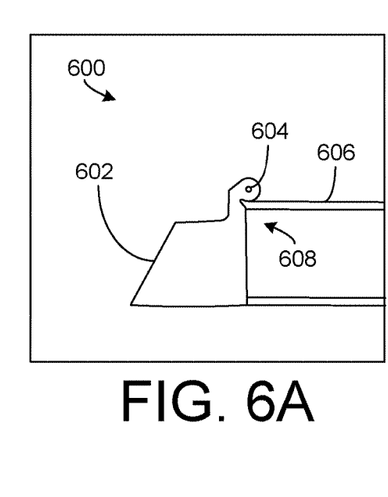
FIGS. 6A-6B show examples of a valve of an oil pickup in closed and open positions.
Figure 6B:
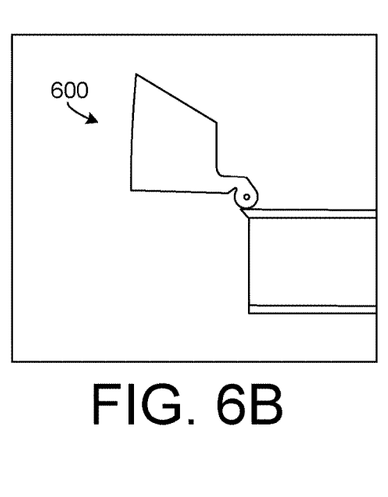

FIGS. 6A-6B show examples of a valve 600 of an oil pickup in closed and open positions. The valve 600 can be used with one or more other examples described elsewhere herein. For example, the valve 600 can serve as any of the valves 404 in FIG. 4 and/or as any of the valves 504 in FIG. 5. The valve 600 includes a valve member 602 that has buoyancy (e.g., by an air cavity) and can rotate about a pivot point 604. The valve 600 is mounted to an oil pickup 606. When oil is not present near the valve 600, such as in FIG. 6A, gravity can rotate the valve member 602 to cover an opening 608 of the oil pickup 606. By contrast, when oil is present near the valve 600, such as in FIG. 6B, the oil can buoy the valve member 602 to not cover the opening 608 of the oil pickup 606.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A motor for a vehicle, the motor comprising:
a motor housing;
an oil sump mounted to the motor housing for oil to drain from the motor housing into the oil sump, a width of the oil sump being greater than a depth of the oil sump, the oil sump having an oil pickup for circulating the oil;
a first oblong valve member mounted at a first pivot point inside the oil sump, the first oblong valve member enclosing a first air cavity for buoyancy, wherein the first oblong valve member is configured to rotate about the first pivot point due to being buoyed by the oil to open or close a first opening, the first oblong valve member having a first end and a second end and a first longitudinal axis extending between the first end and the second end, wherein the first oblong valve member has a first extent along the first longitudinal axis between the first and second ends of the first oblong valve member, which is greater than an extent of the first oblong valve member in a direction perpendicular to the first longitudinal axis, the first longitudinal axis being aligned with a first axis corresponding to forward and rearward travel of the vehicle; and
a second oblong valve member mounted at a second pivot point inside the oil sump, the second oblong valve member enclosing a second air cavity for buoyancy, wherein the second oblong valve member is configured to rotate about the second pivot point due to being buoyed by the oil to open or close a second opening, the second oblong valve member having a first end and a second end and a second longitudinal axis extending between the first end and the second end, wherein the second oblong valve member has a second extent along the second longitudinal axis between the first and second ends of the second oblong valve member, which is greater than an extent of the second oblong valve member in a direction perpendicular to the second longitudinal axis, the second longitudinal axis being aligned with a second axis corresponding to left and right lateral acceleration of the vehicle.

2. The motor of claim 1, further comprising a bracket providing the first pivot point, the first oblong valve member mounted using the bracket.

3. The motor of claim 2, further comprising a member on at least one of the bracket or the first oblong valve member, the member providing overtravel protection for the first oblong valve member.

4. The motor of claim 1, further comprising a biasing member that applies a bias to a rotation of the first oblong valve member at the first pivot point.

5. The motor of claim 4, wherein the bias provides a damping of an opening motion of the first oblong valve member.

6. The motor of claim 4, wherein the bias provides a preload toward a closing motion of the first oblong valve member.

7. The motor of claim 1, wherein the oil sump is mounted to the motor for the oil to drain from the motor housing into the oil sump through first and second openings in the motor housing, and wherein the first oblong valve member is configured to rotate about the first pivot point between a first position covering the first opening, due to being buoyed by the oil, and a second position not covering the first opening.

8. The motor of claim 7, wherein the first oblong valve member is positioned behind the oil pickup in a forward travel direction of the vehicle.

9. The motor of claim 7, wherein each of the first and second oblong valve members and the first and second openings has a stadium shape.

10. The motor of claim 7, wherein the first oblong valve member comprises a bulbous portion that at least in part encloses the first air cavity, and wherein the bulbous portion is configured to extend into the first opening when the first oblong valve member covers the first opening.

11. The motor of claim 1, wherein the first and second openings and the first and second oblong valve members are distributed at least along the first axis.

12. The motor of claim 1, wherein the first and second openings and the first and second oblong valve members are distributed at least perpendicularly to the first axis.

13. A motor for a vehicle, the motor comprising:
a motor housing; and
an oil sump mounted to the motor housing for oil to drain from the motor housing into the oil sump, the oil sump having a manifold coupled to an oil pickup for circulating the oil, wherein the manifold comprises first, second, third and fourth arms with first, second, third and fourth openings for the oil pickup at ends of the first, second, third and fourth arms, respectively, and first, second, third and fourth oblong valve members mounted to respective ones of the first, second, third and fourth openings, each of the first, second, third and fourth oblong valves enclosing a respective air cavity for buoyancy, having a first end and a second end and a longitudinal axis extending between the first end and the second end, wherein each oblong valve has an extent along the longitudinal axis between the first and second ends, which is greater than an extent of the valve in a direction perpendicular to the longitudinal axis, and being configured to rotate about a respective pivot point, wherein the first arm is substantially parallel with the third arm, wherein the second arm is substantially perpendicular to the first arm and is substantially parallel with the fourth arm, wherein the first valve member faces in a direction substantially opposite to the third valve member, wherein the second valve member faces in a direction substantially opposite to the fourth valve member, wherein the longitudinal axis of the first oblong valve and the longitudinal axis of the third oblong valve are aligned with a first axis corresponding to forward and rearward travel of the vehicle, and wherein the longitudinal axis of the second oblong valve and the longitudinal axis of the fourth oblong valve are aligned with a second axis corresponding to left and right lateral acceleration of the vehicle.

* * * * *